UNITED STATES PATENT OFFICE.

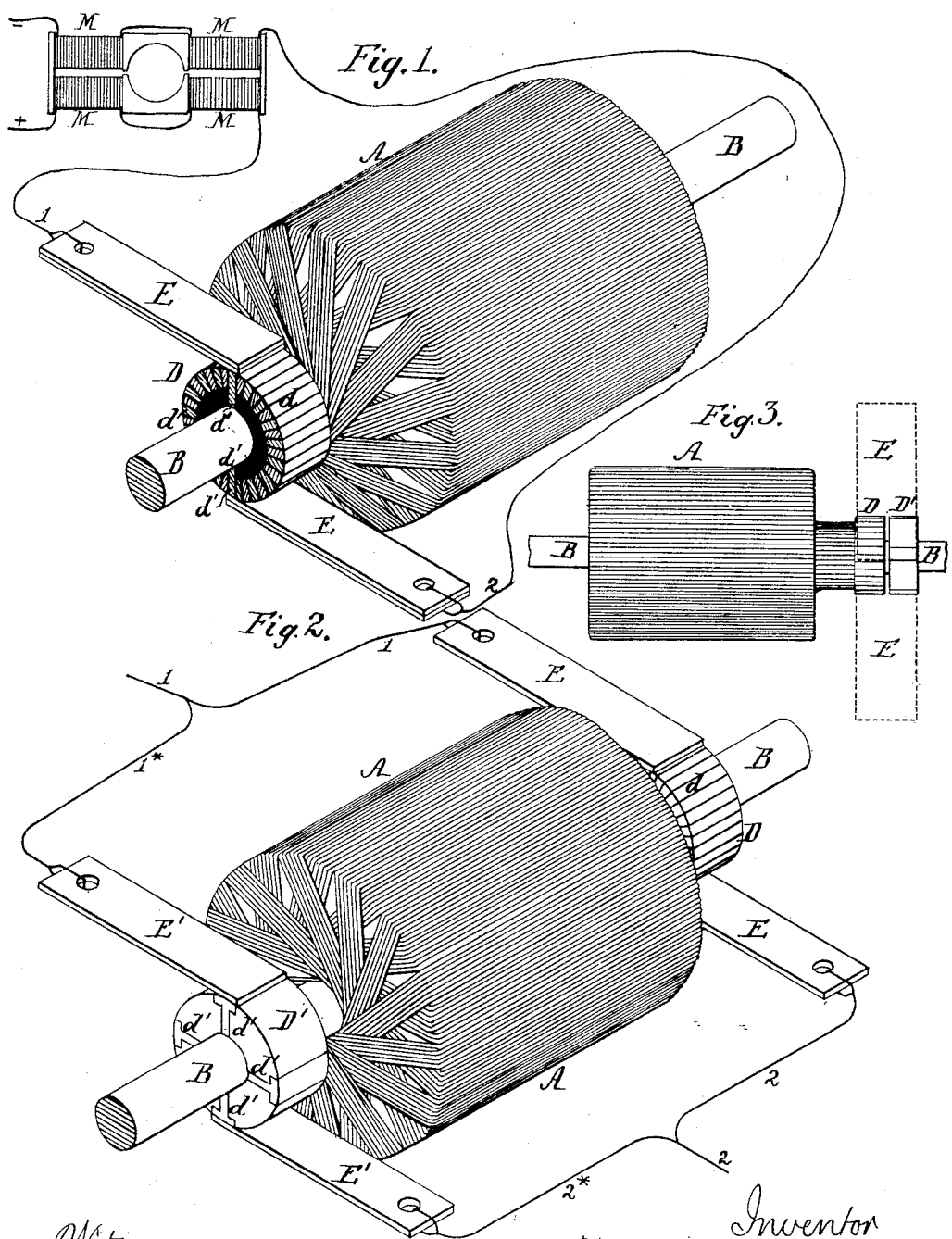

WALTER K. FREEMAN, OF BROOKLYN, NEW YORK, ASSIGNOR TO W. F. JOBBINS, OF EAST ORANGE, NEW JERSEY.

ELECTRIC MOTOR.

SPECIFICATION forming part of Letters Patent No. 264,272, dated September 12, 1882.

Application filed June 12, 1882. (No model.)

*To all whom it may concern:*

Be it known that I, WALTER K. FREEMAN, a citizen of the United States, and a resident of Brooklyn, New York, have invented certain Improvements in Electric Motors, of which the following is a specification.

The object of my invention is to so construct an electro-magnetic motor as to increase the driving-power of the machine; and this object I attain by providing the armature with means whereby the current may be automatically short-circuited, so as to cut all the armature-coils out of circuit periodically when the machine is in operation.

In the accompanying drawings, Figure 1 is a diagram showing an armature, commutator, and brushes in perspective and an example of the field-magnet circuit on a smaller scale; Fig. 2, a similar perspective diagram of a modification, and Fig. 3 a diagram of another modification.

As my invention is applicable to any of the various styles of electric motors, I have not deemed it necessary to illustrate the field-magnets and details of the machine, but only that part to which my invention relates.

The form of the armature will vary with the construction of the machine to which my invention is applied; but in the accompanying drawings I have shown an armature, A, of the well-known cylindrical form, mounted on a shaft, B, and wound into any desired number of coils, whose terminal wires are electrically connected to the plates $d$ of the commutator D. On the periphery of the commutator bear the brushes E E in the usual manner, with the circuit-wires 1 2 connected with them to carry the current through the coils of the armature, and, as usually constructed, all the commutator-plates are insulated from each other and from the shaft or hub B, and are connected to the terminals of the coils of the armature, so that the current is always in circuit through one or more of the said coils during the entire revolution of the shaft, although the circuit is rapidly changed from one or more of the coils to others.

I have found that by intermittently short-circuiting the current so as to cut all the coils of the armature out of circuit while the field-magnet coils remain in the circuit the electrical impulses appear to be exerted with greater effect, and a great increase in the driving-power of the motor is obtained. One of the simplest forms of such an automatic cut-out for thus short-circuiting the current is illustrated in Fig. 1. In machines where a pair of commutator-brushes bear on diametrically-opposite plates of the commutator-wheel I electrically connect, say, two such opposite plates or segments, $d'\ d'$, with each other through the medium of the hub or shaft B, or by a connecting-wire, so that whenever during the revolution of the shaft the brushes bear on these plates $d'\ d'$ the current will pass directly from one brush E to the other through these connected segments or plates $d'\ d'$, and consequently twice during every revolution the current will be thus short-circuited, so as to cut all the coils of the armature out of circuit, while the field-magnet coils M remain in the circuit. If desired, more than two of the segments may be so connected as to cut out the current more than twice during each revolution.

Instead of making the automatic cut-out in the commutator itself, a separate cut-out in the form of a wheel, D', may be provided and secured to the shaft B at another point—say at the opposite end of the armature. In this instance the wheel D' is provided with four segments, $d'$, electrically connected to each other through the shaft B, and two brushes, E', connected to the wires 1 and 2 by wires 1* and 2*, bear on the wheel D' at diametrically-opposite points, so that four times during every revolution the current will be short-circuited through the wire 1*, brushes E' E', connected segments $d'$, and wire 2*, and all the coils of the armature will be at that moment cut out of circuit.

If desired, the wheels D and D' may be arranged side by side, in which case one pair of wide commutator-brushes, E, may be used for both wheels, instead of separate pairs, E E', Fig. 3.

I am aware of Wilde's English Patent No. 2,762 of 1865, in which is described the short-circuiting of all the coils of the armature of his magneto-electric machine and of the coils of the electro-magnets of his electro-magnetic machine whenever the armature is "at the dead-point." This I do not desire to claim; but I claim as my invention—

1. An electric motor in which an armature, brushes, and commutator are combined with field-magnets having their coils always in the circuit while the machine is in operation, and an automatic cut-out, substantially as described, whereby the current may be short-circuited to cut all the coils of the armature out of circuit, while the field-magnet coils remain in the circuit.

2. An electro-magnetic motor in which an armature is combined with a pair of commutator-brushes and a commutator having two of its plates on which the two brushes bear at certain points of the revolution of the shaft in direct electric connection, all substantially as described.

In testimony whereof I have signed my name to this specification in the presence of two subscribing witnesses.

WALTER K. FREEMAN.

Witnesses:
JOHN H. KATTENSTROTH,
HUBERT HOWSON.